Sept. 15, 1925.
H. A. TRAVERS
1,553,411
REGULATOR SYSTEM
Filed March 1, 1922
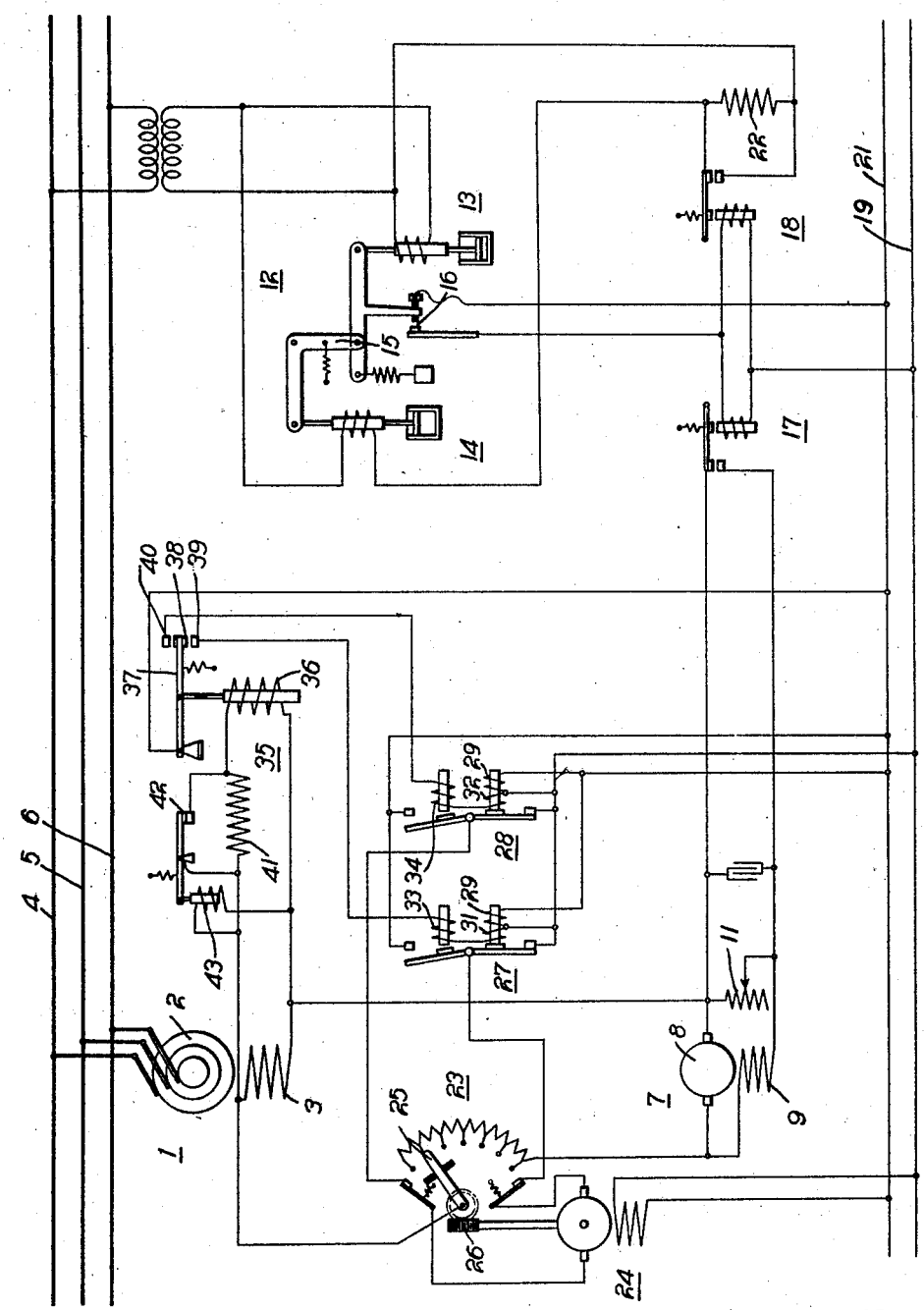
WITNESSES:
INVENTOR
Henry A. Travers
BY
ATTORNEY Patented Sept. 15, 1925.

1,553,411

UNITED STATES PATENT OFFICE.

HENRY A. TRAVERS, OF FOREST HILLS BOROUGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 1, 1922. Serial No. 540,178.

*To all whom it may concern:*

Be it known that I, HENRY A. TRAVERS, a citizen of the United States, and a resident of Forest Hills Borough, in the county of Allegheny and State of Pennsylvania, have invented a new and useful Improvement in Regulator Systems, of which the following is a specification.

My invention relates to electric regulator systems and has special relation to systems for maintaining substantially constant voltage conditions upon a power circuit.

One object of my invention is to provide a regulator system that shall be quickly responsive to correct for variations in a characteristic of the power circuit.

Another object of my invention is to provide a regulator system of the above-indicated character that shall be operative over a range of voltage that is limited only by the capacity of the machines connected to the system.

Another object of my invention is to provide a regulator system of the above-indicated character that shall permit the use of smaller dynamo-electric machines with the same force and effect as machines of the usual size operating without the present invention.

More specifically, my invention relates to an alternating-current system embodying a synchronous condenser which is excited by means of an auxiliary generator. A vibrating contact regulator is provided for adjusting the voltage of the exciter generator in accordance with the line voltage. Normally, such regulators have the relays thereof energized in accordance with the exciter voltage. This introduces a limitation into the operation of the regulator, since the relays thereof will not have sufficient energization to attract the armatures thereof at the lower exciter voltages. In practice, this has been found to limit the range of exciter voltage that may properly be regulated to an outside ratio of three to one.

To remove this limitation, it is proposed to energize the relays of the vibratory regulator from an independent source so that the action of the regulator will not be limited by variations in the exciter voltage. Therefore, the only limitation to satisfactory regulation will be the limit of stable operation of the exciter. That is to say, the vibratory regulator will control the exciter from substantially the residual voltage thereof to the maximum voltage for which it is designed.

In operating synchronous condensers, it has been discovered that, if the excitation of the condenser field-magnet winding could be reduced below the residual magnetism of the exciter and properly regulated at that point, it would be possible to cause a smaller condenser to take current from the line which lags considerably behind the electromotive force thereof without requiring the use of a synchronous condenser having a field-magnet winding capable of receiving a large excitation current so that, at an intermediate point between residual voltage and maximum voltage of the exciter, the condenser would be caused to take a lagging current from the line. Thus, it would be possible to provide a smaller synchronous condenser requiring a smaller excitation current, which condenser would be caused to take lagging current from the line by lowering the field excitation thereof, thereby materially reducing the cost of condenser installations.

The system of the present invention contemplates accomplishing the under-excitation of the condenser-field-magnet winding by inserting a motor-operated rheostat in the circuit between the exciter and the condenser-field-magnet winding and controlling the rheostat by means of an electromagnet that is connected to the terminals of the condenser field winding. As the voltage thereof becomes low, approaching the residual voltage of the exciter and, therefore, the limit of its satisfactory operation, the electromagnet will cause the insertion of the rheostat in the excitation circuit. The voltage impressed upon the condenser field winding will be reduced thereby, and the exciter will operate above the residual magnetism thereof, or, in other words, within the limits of its best operating characteristics. It will be noted that the exciter is not disconnected and that the vibratory regulator is enabled to continue to control the operation of the synchronous condenser, although the condenser field-magnet winding may be receiving a minimum effective excitation.

My invention will be better understood by reference to the accompanying drawing, the single figure of which is a diagrammatic illustration of the system and apparatus embodying my invention.

A synchronous condenser 1, comprising an armature 2 and a field-magnet winding 3, is connected to a transmission line or power circuit comprising conductors 4, 5 and 6. The condenser field-magnet winding 3 is adapted to be energized from an exciter 7, comprising an armature 8 and a field-magnet winding 9. The field-magnet winding 9 has a variable resistor 11 in circuit therewith. The operation of the synchronous condenser is controlled by means of a vibratory regulator 12, which may be of the well-known Tirrill type, comprising a control electromagnet 13, an anti-hunting electromagnet 14 and a lever system 15 for controlling the operation of a pair of contact members 16. The contact members 16 govern the energizing circuit for a plurality of relays 17 and 18, which relays are energized from control bus bars 19 and 21, these bus bars being connected to an independent source of voltage, such as a storage battery (not shown). The relay 17 controls a shunt circuit for the resistor 11, which is in circuit with the field-magnet winding 9 of the exciter. The relay 18 controls a shunt circuit for a resistor 22, which is in circuit with the anti-hunting electromagnet 14. As heretofore explained, the vibratory regulator 12 will properly regulate the operation of the synchronous condenser over the range of exciter voltage from approximately the residual voltage thereof to the maximum voltage for which it may be designed.

From time to time, it becomes desirable to operate the synchronous condenser below the residual magnetism of the exciter. The present invention contemplates providing a rheostat 23 having a motor 24 that is adapted to control the arm 25 thereof through gearing 26. The direction of rotation of the motor 24 is controlled by reversing switches 27 and 28 having constantly-energized coils 29. Neutralizing coils 31 and 32 and the respective operating coils 33 and 34 are adapted to be selectively energized by the operation of an electromagnet 35, the energizing coil 36 of which is connected to the terminals of the condenser field-magnet winding 3. The electromagnet 35 controls the position of an arm 37 to cause the contact member 38 carried thereby to engage with contact members 39 and 40, respectively. A resistor 41 is inserted in circuit with the coil 36 of the electromagnet 35 and is normally short-circuited through contact members 42 that are controlled by means of an electromagnet 43, which is connected in circuit with the coil of electromagnet 35. When the voltage impressed upon the coil 36 is above a safe operating value, the resistor 41 is inserted in circuit therewith to prevent injury to the electromagnetic device 35.

Briefly described, the operation of the system is as follows:—

The vibratory regulator 12 will function in a well-known manner to control the operation of the synchronous condenser over the stable operating range of the exciter 7. In the normal design of the system, the exciter 7 will be so proportioned with reference to the condenser field-magnet winding 3 that, as the condenser field-magnet winding receives the higher excitation values, the condenser will be over-excited and thereby caused to supply leading current to the line.

When it is desired to under-excite the synchronous condenser below the residual magnetism of the exciter to cause the condenser to draw lagging current from the line, the electromagnetic device 35 will be operated as the voltage upon the condenser field-magnet winding approaches the residual voltage of the exciter. The rheostat 23 will thus be inserted in the excitation circuit of the condenser field-magnet winding. The condenser field-magnet winding, therefore, receives a lower excitation while still permitting the exciter to operate above the residual magnetism thereof. Since the relations of the exciter and condenser have not been otherwise disturbed, the vibratory regulator 12 will continue to function to properly regulate the synchronous condenser, although the field-magnet winding thereof is receiving a voltage below the residual voltage of the exciter.

While the present invention has been described above in connection with a system employing a synchronous condenser, it will be obvious that the same apparatus may be employed in connection with alternating-current generators to minimize the self-excitation thereof. Assuming a condition where the generator is unloaded and the voltage of the exciter has been reduced substantially to the residual voltage thereof, a condition may exist where the excitation of the generator is still too high. With the present system, the electromagnet 35 would then insert the rheostat 23 in circuit so that the voltage impressed upon the generator field-magnet winding would be below the residual voltage of the exciter, while still permitting the exciter to operate above its residual voltage and also permitting the regulator to continue to function in the normal manner.

Modifications in the system and arrangement and location of parts may be made within the spirit and scope of my invention, and such modifications are intended to be covered by the appended claims.

I claim as my invention:—

1. In a regulator system, the combination with a power circuit, a dynamo-electric machine connected thereto and having a field-magnet winding, and an exciter therefor, of regulator means controlled in accordance with a characteristic of said circuit and adapted to control the excitation of said machine to substantially the residual voltage of said exciter, and means co-operating with said exciter and controlled in accordance with the operating condition of said field-magnet winding, whereby said regulator will be enabled to control the operation of said dynamo-electric machine over a wider range.

2. In a regulator system, the combination with a power circuit, a dynamo-electric machine connected thereto having a field-magnet winding, an exciter generator for said field-magnet winding, and regulator means adapted to control the excitation of said dynamo-electric machine until it corresponds approximately to the residual voltage of said exciter, of means for varying the excitation of said dynamo-electric machine below the residual voltage of the exciter and comprising a motor-operated rheostat, a plurality of switches adapted to control the rotation of said motor, and electroresponsive means energized in accordance with the voltage impressed upon said field-magnet winding for selectively operating said switches.

3. In a regulator system, the combination with a power circuit, a dynamo-electric machine connected thereto having a field-magnet winding and an exciter generator therefor, of regulator means adapted to control the excitation of said dynamo-electric machine until it corresponds approximately to the residual voltage of said exciter, and means comprising a motor-operated rheostat and electroresponsive means operating proportional to the excitation of said machine for varying the excitation of said dynamo-electric machine below the residual voltage of the exciter.

4. In a regulator system, the combination with a power circuit, a dynamo-electric machine connected thereto and having a field-magnet winding and an exciter generator therefor, of regulator means adapted to control the excitation of said dynamo-electric machine until it corresponds approximately to the residual voltage of said exciter, and means for varying the excitation of said dynamo-electric machine below the residual voltage of the exciter, said means comprising a motor-operated rheostat, electroresponsive means operating proportional to the excitation of said machine, and means for preventing hunting action.

5. In a regulator system, the combination with a power circuit, a dynamo-electric machine connected thereto and having a field-magnet winding, and an exciter generator therefor, of regulator means adapted to control the excitation of said dynamo-electric machine until it corresponds approximately to the residual voltage of said exciter, and means for varying the excitation of said dynamo-electric machine below the residual voltage of the exciter, said means comprising a motor-operated rheostat, electroresponsive means operating proportionally to the excitation of said machine, and means for modifying the current value traversing said last-mentioned means.

6. In a regulator system, the combination with a transmission line, a synchronous condenser connected thereto, an exciter therefor, and means operated in accordance with the voltage of the line to control the excitation of said exciter between approximately the residual voltage and the maximum voltage thereof to maintain substantially constant line conditions, said means comprising a control electromagnet, an anti-hunting electromagnet, a pair of contact members controlled thereby and a plurality of relays governed in accordance with the operation of said contact members, said relays being energized from an independent source, of means for impressing upon said condenser field-magnet winding a voltage below the residual voltage of the exciter, said means comprising a rheostat located in the excitation circuit of said condenser field-magnet winding, a motor for operating said rheostat, a plurality of switches adapted to control the direction of rotation of said motor, and electromagnetic means connected across the terminals of said condenser field winding and adapted to selectively control said switches.

7. In a regulator system, the combination with a power circuit, a dynamo-electric machine connected thereto, an exciter therefor, and means operated in accordance with power-circuit conditions for controlling the operation of said exciter between approximately the residual voltage and the maximum voltage thereof, said means comprising a control electromagnet, an anti-hunting electromagnet, and a plurality of relays governed thereby, said relays being energized from an independent source, of means for impressing upon said dynamo-electric machine an excitation voltage below the residual voltage of the exciter, said means comprising a rheostat, means energized in accordance with the operating conditions of said machine and means adapted to vary the value of the operating current of said last-mentioned means.

In testimony whereof, I have hereunto subscribed my name this 28th day of February, 1922.

HENRY A. TRAVERS.